US012681452B2

(12) United States Patent
Baughman et al.

(10) Patent No.: US 12,681,452 B2
(45) Date of Patent: Jul. 14, 2026

(54) EXOSKELETON SYSTEM TO PROVIDE ASSISTANCE FOR USERS PERFORMING ACTIVITIES

(71) Applicant: International Business Machines Corporation, Armonk, NY (US)

(72) Inventors: Aaron K. Baughman, Cary, NC (US); Amit Kumar Raha, Barrackpore (IN); Kavitha Hassan Yogaraj, Bangalore (IN); Christian Eggenberger-Wang, Wil (CH)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 18/493,841

(22) Filed: Oct. 25, 2023

(65) Prior Publication Data

US 2025/0138501 A1 May 1, 2025

(51) Int. Cl.
*G05B 19/04* (2006.01)
*G05B 19/042* (2006.01)

(52) U.S. Cl.
CPC ................................ *G05B 19/0426* (2013.01)

(58) Field of Classification Search
CPC ........................... G05B 19/0426; B25J 9/0006
See application file for complete search history.

(56) References Cited

U.S. PATENT DOCUMENTS

| | | | |
|---|---|---|---|
| 10,459,440 B2 | 10/2019 | Rust | |
| 10,635,752 B2 | 4/2020 | Zhou | |
| 10,813,642 B2 | 10/2020 | Beisel | |
| 11,772,259 B1 * | 10/2023 | Kiehl | ........................ A61H 3/00 |
| | | | 700/245 |
| 2017/0220998 A1 * | 8/2017 | Horn | ........................ H04L 51/52 |
| 2017/0270431 A1 | 9/2017 | Hosabettu | |
| 2019/0310636 A1 | 10/2019 | Halder | |
| 2022/0084433 A1 * | 3/2022 | Wilson | .................... G10L 15/22 |

(Continued)

FOREIGN PATENT DOCUMENTS

| | | |
|---|---|---|
| CN | 114248283 A | 3/2022 |
| CN | 116100565 A | 5/2023 |

(Continued)

OTHER PUBLICATIONS

Banas, Jacob, "Exoskeletons are About to Walk Ford's Factory Floors", Aug. 18, 2018, Futurism, 9 pages, <https://futurism.com/exoskeletons-ford-factory>.

(Continued)

*Primary Examiner* — Christopher W Carter
(74) *Attorney, Agent, or Firm* — Monchai Chuaychoo

(57) ABSTRACT

An approach for assisting users with physical activities by using one or more exoskeleton suits is disclosed. The approach includes, receiving a plurality of data from a user and devices; analyzing one or more problems associated with the plurality of data; determining one or more solutions for the one or more problems based on the analysis; identifying an optimal solution from the one or more solutions; instructing the one or more exoskeleton suits with the optimal solution, wherein the user wears the one or more exoskeleton suits; and performing the instructions, by the exoskeleton suits, based on the optimal solution.

17 Claims, 10 Drawing Sheets

(56) References Cited

U.S. PATENT DOCUMENTS

2022/0347864 A1    11/2022  Priest
2025/0077996 A1*    3/2025  Boone ............ G06Q 10/063114

FOREIGN PATENT DOCUMENTS

EP            3743811  A1    12/2020
WO        2016083650  A1     6/2016

OTHER PUBLICATIONS

Thomas, Sony, "Exoskeleton suits turn car factory workers into Human Robots", Oct. 19, 2020, Auto News, 7 pages, <https://gulfnews.com/auto/news/exoskeletonsuits-turn-car-factory-workers-into-human-robots-1.1603120315450>.

Zhu et al., "Low cost exoskeleton manipulator using bidirectional triboelectric sensors enhanced multiple degree of freedom sensory system", Nature Communications, https://doi.org/10.1038/s41467-021-23020-3, (2021), 16 pages.

* cited by examiner

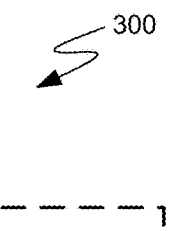
300

Service Identifier

Two services identified ⟍310

Bot Assembler ⟍311

Insurance Bot ⟍312          Medical Bot ⟍313

Knowledge Base

Search Insurance KB ⟍314          Search Medical KB ⟍315

Execution Planner

Generate: Instruction-Goal Set ⟍316          Generate: Instruction-Goal Set ⟍317

Generate overall: Set ⟍318          Generate Individual: Priority Set ⟍319

Instruction Generator

Generate Final: Execution Order Set ⟍320

Data Intelligence Bot searches KB for solutions          Data Intelligence Bot searches KB for solutions

FIG. 3

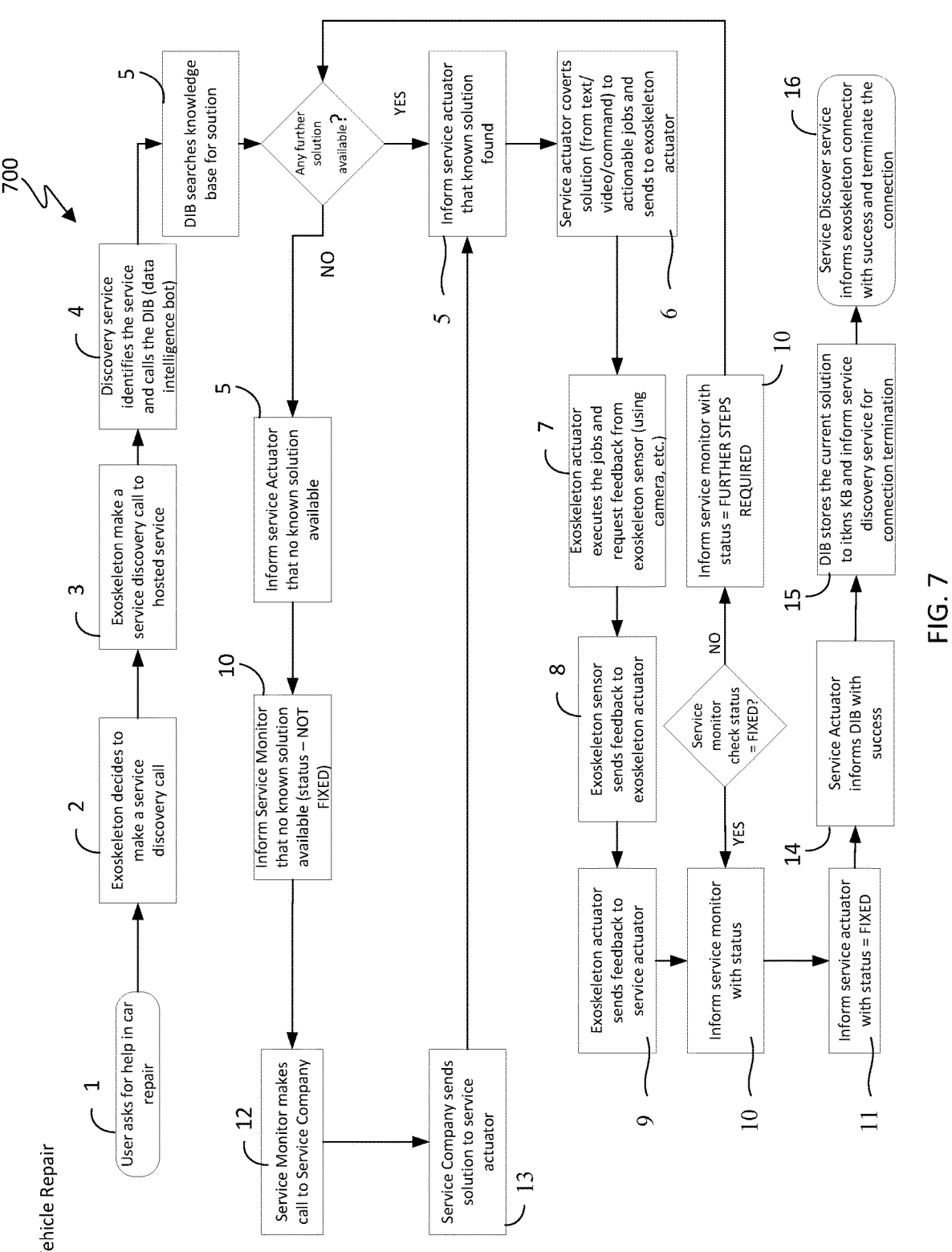

Vehicle Repair

1 — User asks for help in car repair

2 — Exoskeleton decides to make a service discovery call

3 — Exoskeleton make a service discovery call to hosted service

4 — Discovery service identifies the service and calls the DIB (data intelligence bot)

5 — DIB searches knowledge base for soution

Any further solution available?

NO — 5 — Inform service Actuator that no known solution available

YES — 5 — Inform service actuator that known solution found

6 — Service actuator coverts solution (from text/video/command) to actionable jobs and sends to exoskeleton actuator 7 — Exoskeleton actuator executes the jobs and request feedback from exoskeleton sensor (using camera, etc.)

8 — Exoskeleton sensor sends feedback to exoskeleton actuator

9 — Exoskeleton actuator sends feedback to service actuator

10 — Inform service monitor with status

Service monitor check status = FIXED?

NO — 10 — Inform service monitor with status = FURTHER STEPS REQUIRED

YES

11 — Inform service actuator with status = FIXED

14 — Service Actuator informs DIB with success

15 — DIB stores the current solution to itkns KB and inform service discovery service for connection termination 16 — Service Discover service informs exoskeleton connector with success and terminate the connection 10 — Inform Service Monitor that no known solution available (status – NOT FIXED)

12 — Service Monitor makes call to Service Company

13 — Service Company sends solution to service actuator

Use case: Accident

900
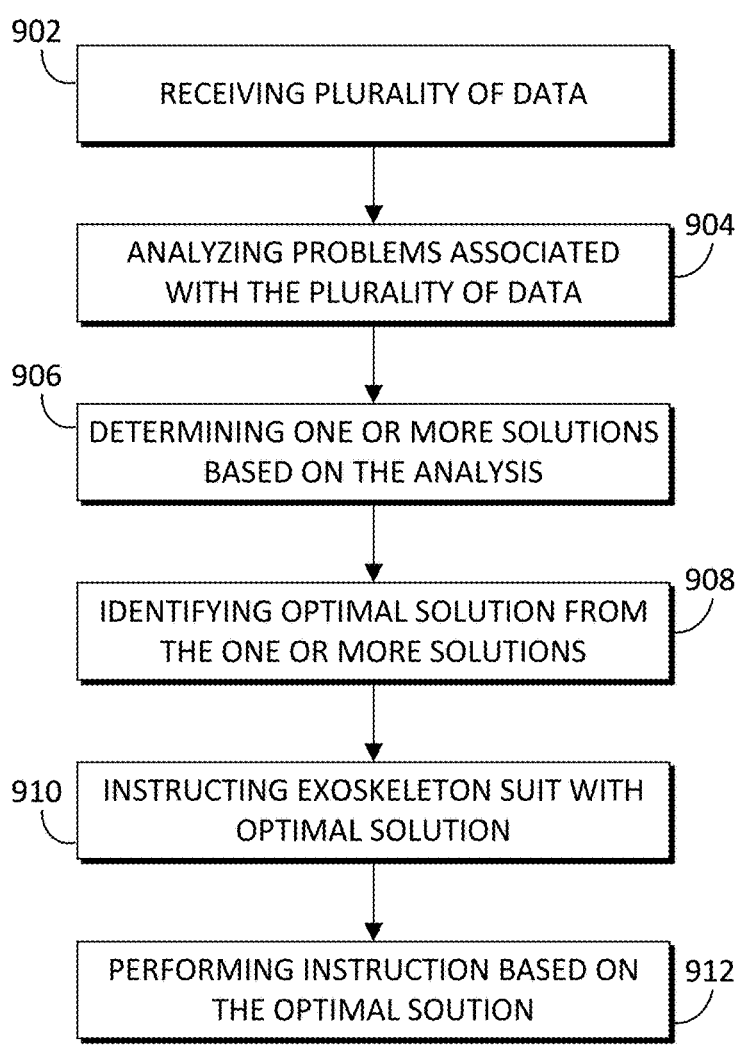
902
RECEIVING PLURALITY OF DATA
904
ANALYZING PROBLEMS ASSOCIATED WITH THE PLURALITY OF DATA
906
DETERMINING ONE OR MORE SOLUTIONS BASED ON THE ANALYSIS
908
IDENTIFYING OPTIMAL SOLUTION FROM THE ONE OR MORE SOLUTIONS
910
INSTRUCTING EXOSKELETON SUIT WITH OPTIMAL SOLUTION
912
PERFORMING INSTRUCTION BASED ON THE OPTIMAL SOUTION
FIG. 9

1000

1005

PERSISTENT STORAGE

1002

MEMORY

1007

COMMUNICATIONS UNIT

1004

1001

PROCESSOR(S)

1003

CACHE

1006

I/O INTERFACE(S)

1008

EXTERNAL DEVICE(S)

1010

DISPLAY

EXOSKELETON SYSTEM TO PROVIDE ASSISTANCE FOR USERS PERFORMING ACTIVITIES

BACKGROUND

The present invention relates generally to travel and transportation and more particularly to leveraging exoskeleton system to assist drivers.

Today, vehicles already have multiple sensors that can collect and send the health/performance data about the vehicle to service-stations (e.g., for preventive and corrective care, for connected cars, etc.). However, there are several situations when repairs or post-accident actions need manual/physical interaction.

Powered Exoskeleton are already being explored in factory environment to assist the factory workers performing tough and repetitive physical work that requires higher precision and possibly, for longer duration.

SUMMARY

Aspects of the present invention disclose a computer-implemented method, a computer system and computer program product for assisting users with physical activities by using one or more exoskeleton suits. The computer implemented method may be implemented by one or more computer processors and may include: receiving a plurality of data from a user and devices; analyzing one or more problems associated with the plurality of data; determining one or more solutions for the one or more problems based on the analysis; identifying an optimal solution from the one or more solutions; instructing the one or more exoskeleton suits with the optimal solution, wherein the user wears the one or more exoskeleton suits; and performing the instructions, by the exoskeleton suits, based on the optimal solution.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which:

FIG. 3 is a diagram illustrating high level steps of data intelligence bot 2100 as it searchs KB for solutions, designated as 300, in accordance with an embodiment of the present invention;

FIG. 7 is a flow chart corresponding to a use case scenario, vehicle accident situation, wherein the steps (1-16) illustrate the process of suit management component 111, in accordance with an embodiment of the present invention;

FIG. 9 is a high-level flowchart illustrating the operation of suit management component 111, designated as 900, in accordance with an embodiment of the present invention.

DETAILED DESCRIPTION

Figure 1:
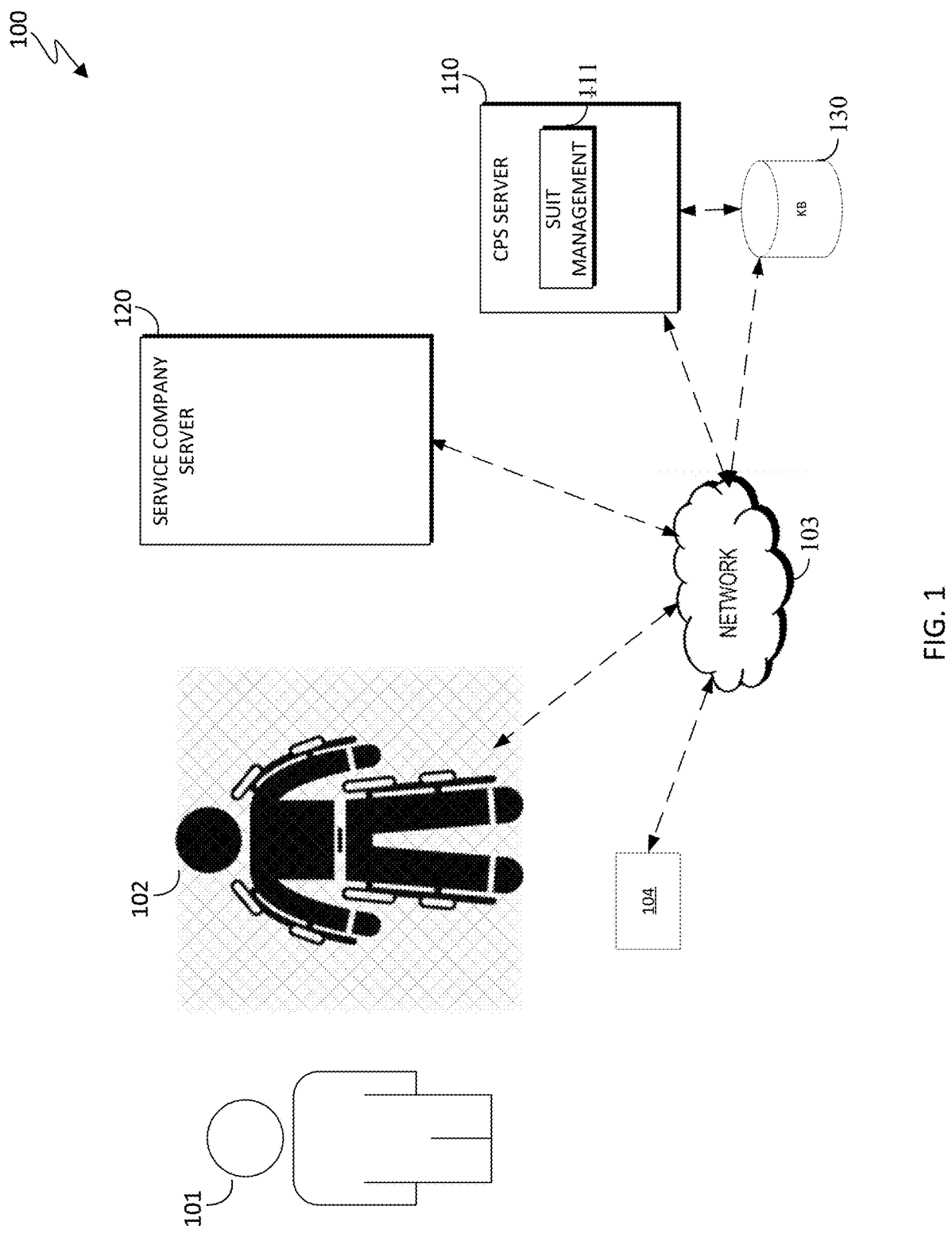
FIG. 1 is a diagram illustrating a high-level overview of the functionality of the exoskeleton management system, designated as exoskeleton management environment 100, in accordance with an embodiment of the present invention.

Today, vehicles already have multiple sensors that can collect and send the health/performance data about the vehicle to service-stations (e.g., for preventive and corrective care, for connected cars, etc.). However, there are several situations when repairs or post-accident actions need manual and physical interaction. However, the driver, may not have the physical strength to perform such actions or may be fatigued from driving.

Thus, there is a need for assisting drivers with resolving issues with their vehicle after an accident and/or a vehicle failure. One approach of the present embodiment allows for exoskeleton suits (worn by the driver) to address those issues. For example, if the driver experiences a flat tire, he/she may not have the strength to operate the jack to lift the vehicle, remove the wheel nuts, and retrieve the spare tire from trunk. Thus, the driver may wear an exoskeleton suit to help them with repairing the flat tire (i.e., remove existing flat and replacing with a spare tire).

The advantages provided by the current embodiment can include, but is not limited to, i) improvements to timely completion of tasks/activities, ii) precision of work product, iii) quality of work product and iv) less risk of safety issues.

Other embodiments of the present invention may recognize one or more of the following facts, potential problems, potential scenarios, and/or potential areas for improvement with respect to the current state of the art: i) solve various vehicle related problems by utilizing an augmented exoskeleton suit with a CPS (central platform service) and ii) making the human commuter experience much more effective by solving various problems (e.g., the repair, insurance, etc.) by the hosted IT services interaction with the exoskeleton suit.

It is noted that examples and scenarios, described throughout the specifications relates to an automobile ecosystem. However, the same method and/or systems (including all embodiments) can be applied for other cross-domain solutions, involving an exoskeleton suit. For example, all embodiment of the present invention can be utilized in the public transportation, airline, shipping (logistics), space, forestry, and agriculture industry. An example as it relates to a shipping industry, workers who sort packages, unload and load packages onto a vehicle, can benefit from the use of an exoskeleton suit.

Definitions

Bots and/or farm of bots are an autonomous program on the internet or another network that can interact with systems or users.

Central platform service (CPS) is defined as a service performed by a farm of bots to assist the exoskeleton suits. The Central Platform Service has the following characteristic and functionality: i) performs the initial analysis on how to offer the best service, for the current situation, ii) host a farm of bots that can collaborate amongst themselves and work with the exoskeletons to take care of multiple types of issues, at the same time, iii) self-aware and situation-aware based on information collected from the exoskeleton, and dynamically respond to the situation and iv) manages and controls the exoskeleton suits to coordinate and run the shared plan in a controlled manner.

Exoskeleton, powered exoskeleton, powered armor, exosuit or the term, "exoskeleton suit" may be used interchangeable but denotes the same definition/terminology.

The term, "hosted IT service," "central platform service" and CPS server 110 may be used interchangeable but denotes the same definition/terminology.

Service company denotes a company that is registered with a hosted IT service company and the term, "service provider" is synonymous and denotes the same terminology as with the term, "service company." Service company can be, but not limited to, an insurance company, medical company, and a vehicle repair/dealer company (see 120 of FIG. 1).

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.
High Level Environment Overview FIG. 1 is a diagram illustrating a high-level overview of the functionality of the exoskeleton management system, designated as exoskeleton management environment 100, in accordance with an embodiment of the present invention.

Exoskeleton management environment 100 includes user 101, exoskeleton suit 102, network 103, IoT devices 104, CPS server 110 (including suit management component 111), service company server 120 and KB database 130.

User 101 is the user of exoskeleton suit (i.e., 102). The user can be a driver of a vehicle, a worker of a shipping company that loads and unload packages or workers in any industrial that relies on physical labor to perform various tasks and activities. In another embodiment, user 101 can be a non-human user of the exoskeleton suit, such as, a dolphin or a dog.
Exoskeleton Suit 102 and Subcomponents Exoskeleton suit 102, also known, as exoskeleton, is a mobile machine that is wearable on a human body (or over an animal body). The exoskeleton suit 102 provides structural support and allows for the user (e.g., human or animal) with increased strength, endurance and dexterity to perform various tasks and activities in any environment. Till date, exoskeletons were capable of assisting its users, by sensing the local movements and actuate corresponding parts (of the exoskeleton) thereby provide a boost to the user. In other words, the sensing and actuating are local to the exoskeleton. However, an embodiment of the present invention discloses the method for an exoskeleton suit (i.e., 102) to connect a CPS (consisting of farm of Bots) instead of the decision making (including sensors, etc.) being local to in the suit. The CPS allows for remote decision making and instructions for the user, wearing the suit, to get appropriate instructions to perform the tasks and activities.

Exoskeleton suit 102 contains the following subcomponents: exoskeleton sensor, exoskeleton connector and exoskeleton actuator part.

Exoskeleton Sensor (ES) are sensors capable of measuring/observing/detecting physical phenomena. There can be many kinds of sensors for the exoskeleton suit. In one example, the exoskeleton suit, through the ES, can sense an issue regarding a damage happening to the owner who is wearing it, not the exoskeleton itself. Thus, exoskeleton sensor senses an issue and through a connector (i.e., through EC), it can make a service discovery call.

Exoskeleton Connector (EC) assists an exoskeleton in making a call to service provider discovery, i.e., to collect data from service provider. The exoskeleton connector allows for seamless integration of the exoskeleton into the software ecosystem. This connector part of exoskeleton serves for connecting to and disconnecting from the service provider. For example, EC can interact with discovery service 2010 to make a connection and disconnection.

Exoskeleton Actuator Part (EAP) allows for instructions (from components and subcomponent of 110) to perform an action command of the exoskeleton suit. An actuator follows a set of instructions and executes the commands. Thus, it could be used to perform an action. For example, physical commands to move arms and legs. An EAP has another intelligence capability, that it can monitor the overall actions.

In another capability, an EAP can send commands to inform the service provider that a problem has been solved. If an actuator informs the service provider that the problem is not resolved, the service provider must connect to an actual service representative to solve the issue (using the service monitor 2400 module).

Network 103 can be, for example, a telecommunications network, a local area network (LAN), a wide area network (WAN), such as the Internet, or a combination of the three, and can include wired, wireless, or fiber optic connections. Network 103 can include one or more wired and/or wireless networks that are capable of receiving and transmitting data, voice, and/or video signals, including multimedia signals that include voice, data, and video information. In general, network 103 can be any combination of connections and protocols that can support communications between server 110, 120, 130 and other computing devices (not shown) within exoskeleton management environment 100. It is noted that other computing devices can include, but is not limited to, exoskeleton suit 102, IoT devices 104 and any electromechanical devices capable of carrying out a series of computing instructions.

IoT devices 104 can be any smart/IoT (internet of things) device (e.g., wearable smart devices, smart phones, wireless camera, etc.) including various sensors (e.g., thermal sensors/imaging, heart rate monitor and microphones) that is capable of gathering real-time data (e.g., video images, temperature, humidity, etc.).

CPS server 110 and service company server 120 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, CPS server 110 and/or server 120 can be a laptop computer, a tablet computer, a netbook computer, a personal computer (PC), a desktop computer, a personal digital assistant (PDA), a smart phone, or any other programmable electronic device capable of communicating with other computing devices (not shown) within exoskeleton management environment 100 via network 103. In another embodiment, CPS server 110 and server 120 represent a computing system utilizing clustered computers and components (e.g., database server computers, application server computers, etc.) that act as a single pool of seamless resources when accessed within exoskeleton management environment 100.

CPS Server 110

CPS server 110 includes suit management component 111 and subcomponents to suit management component 111 (e.g., data intelligence bot, service actuator, etc.) that will be described in further details as it relates to FIG. 2. Suit management component 111 and/or CPS server 110 have the ability to manage exoskeleton suit 102 and can communicate to server 120.

The CPS is capable of hosting a farm of bots that can collaborate amongst themselves and work with the exoskeletons to take care of multiple types of issues, simultaneously. Generally, the farm of bots has the following characteristics and capabilities: i) each of these bots have their own intelligence and specialize in different domains, such as, repair assistance, insurance assistance, paramedical assistance, police assistance, etc., ii) the bots use the connected exoskeleton, and guides the person while, performing the relevant tasks and iii) the bots are added to the platform or farm by an organization and will acts as proxy for an expert in the respective organization.

The CPS has the following characteristics and capabilities: i) the central platform service is situation-aware based on information collected from the exoskeleton, and dynamically respond to the situation, ii) the central platform service dynamically assembles the bots from the farm of bots, to achieve the desired goal, iii) it publishes the intermediate milestones that must be achieved, before reaching the desired, final goal, iv) it enables the bots (with cross cutting concerns) to collaborate and come up with a shared plan and individual plans (using execution planner), to achieve the desired goals, v) the central platform service uses the exoskeleton to coordinate and run the shared plan in a controlled manner, vi) using instruction executer, the central platform service orchestrates the execution of the shared plan using the exoskeleton, which executes the commands, vii) using instruction controller, the central platform service monitors the execution of the shared plan milestone by milestone, to give feedback to the bots and viii) the central platform service uses the signals from the bots, at the end of every milestone, to re-plan the execution if necessary.

KB Database 130

KB (knowledge base) database 130 is a database that contains a volume of knowledge (based on known and possibly unknown problems). For example, unknown problems in which services (i.e., 110 or 120) can be used for lookup/searches. KB database 130 can reside as a standalone database server or can reside as a database within 110 and/or 120 (see FIG. 1).

What sort of data is stored on KB database 130? Data can include, but is not limited to, a set of solutions, of which each consists of a sequence of instructions to be executed, some instructions to collect some more data, medical knowledge base, vehicle repair knowledge base, all exoskeleton knowledge base, AVMS (autonomous vehicle management system) knowledge base, sensors knowledge base, insurance knowledge base and garage location knowledge base.

Using CPS server 110 as an example where 110 had a direct connection to KB database 130, CPS server 110, through suit management component 111, can create data entries (i.e., add to the knowledge base) by using online yellow pages or similar web search. Suit management component 111 can maintain a database of crawled data from all the service providers, including data provided from the service company itself etc.

Components and Subcomponents of Suit Management Component 111

Figure 2:
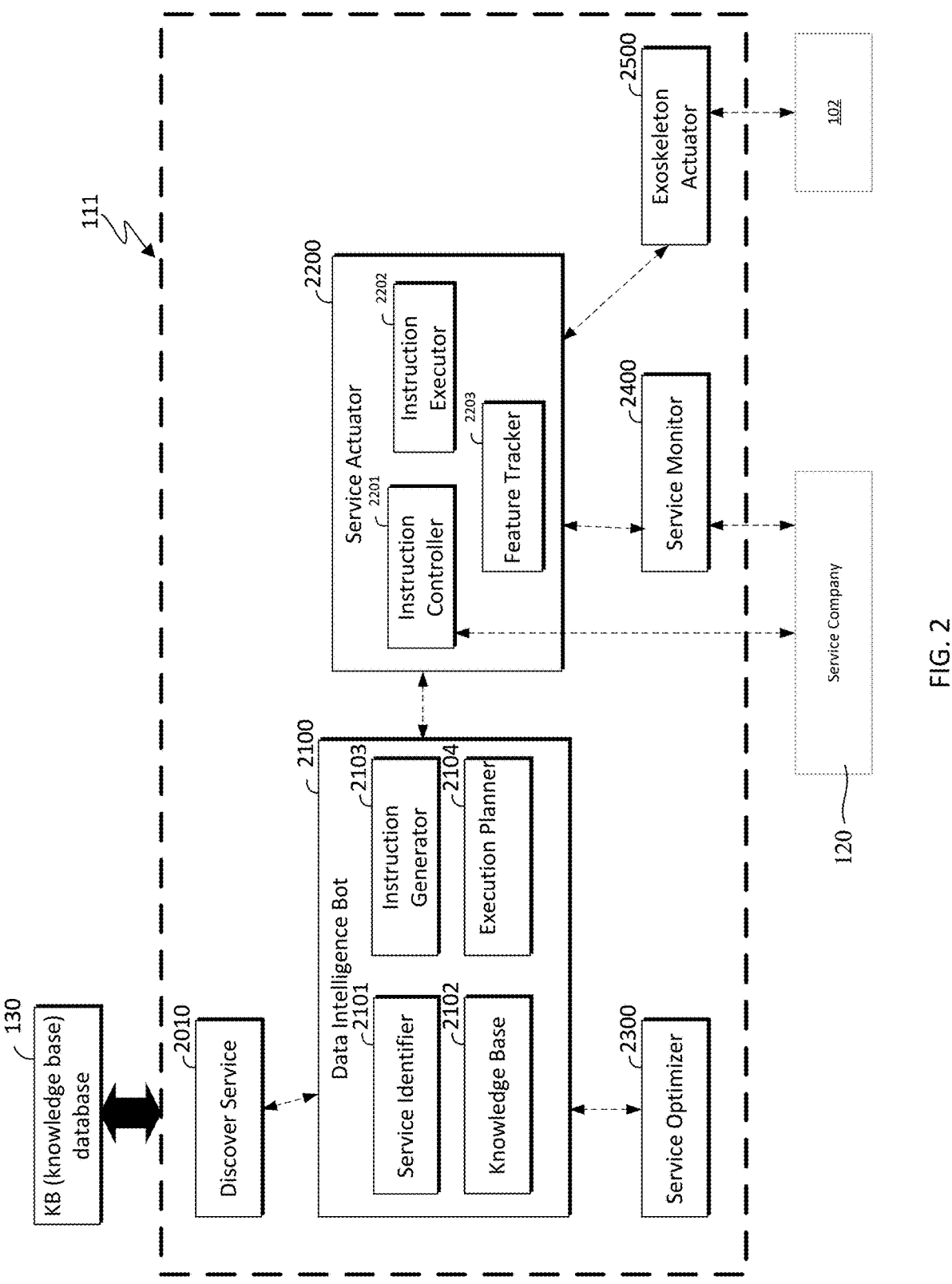
FIG. 2 is a diagram illustrating subcomponents of suit management component 111, in accordance with an embodiment of the present invention.

FIG. 2 is a diagram illustrating components and subcomponents of suit management component 111, in accordance with an embodiment of the present invention. Suit management component 111 is made up of several components and subcomponents: discover service 2010, data intelligence bot 2100, service actuator 2200, service optimizer 2300, service monitor 2400 and exoskeleton actuator 2500.

Discover Service 2010

Discover service 2010 is a module (e.g., bots, etc.) used to connect and disconnect a service provider with the exoskeleton. One example of a capability of discover service 2010 is that it receives an initial call from exoskeleton (wherein discover service 2010 has a knowledge base for a hosted IT/CPS server 110) and depending on the requirement, it decides the services to be selected and then it can discover the service provider.

Data Intelligence Bot 2100

Data intelligence bot 2100 is a collection of bots. Data intelligence bot 2100 contains the following subcomponents (see FIG. 2): service identifier 2101, knowledge base 2102, instruction generator 2103 and execution planner 2104.

Service Identifier 2101

Service identifier 2101 is a collection of bots to perform a shared set of functionalities and capabilities. One of the capabilities of service identifier 2101 is the ability to collect the nature of the issue from the problem end. Therefore, service identifier 2101 can make use of chatbots (with customers) to know if it's a known issue. Hence, if there is a known problem then there is a known solution. Service identifier 2101 can differentiate a problem into a known/unknown problem by leveraging the search engine from the knowledge base (i.e., knowledge base 2102). Furthermore, service identifier 2101 can modify the service required based on the search return.

Knowledge Base 2102

Knowledge base 2102 is a collection of bots to perform a set of functionalities and capabilities. These farm bots have the following characteristics and/or capabilities: i) a place where bots are created by a service company, ii) procedure involves bidding and billing, wherein the lowest bid meeting certain criteria will get billed, iii) a set of goals and milestone will be created to as responsibilities of the bots, iv) after the bidding and billing process an assembly of the bots occurs (gathering the required bots), and v) each bot is an intelligent entity and thus, during service monitoring/execution also, if the monitoring/execution status is not satisfying, re-planning must be done (i.e., self-aware bots).

These bots could be any or many of the following types: a) repair bot, b) rescue bot, c) vehicle insurance bot, d) medical insurance bot, e) paramedic bot and f) shopping bot. For example, each bot comes with its own set of rules and each bot has derived goals and shared goals. Derived goals are a set of instructions from each bot to resolve a problem. Data are stored as issue and a solution pair. The solutions are set of instructions-goal pairs and goals have milestones.

In one example, knowledge base 2102 receives a problem relating to a vehicle accident. The problem requires a service bot, but what kind of service bot? One service bot to be utilized to solve the problem could be a vehicle insurance bot. Eventually, various solutions can be delivered by this particular bot (i.e., insurance bot). Thus, by having these specific bots, each bot will have its own knowledge base of known solution.

Instruction Generator 2103

One of the purposes for instruction generator 2103 is to achieve/perform a shared goal. This achievement takes care of combining the question of, "How to interleave all the steps?". Therefore, instruction generator 2103 can make a plan combining the steps from all the bots, considering derived goals of each bot and coming up with the shared goal among many bots. Typically, instruction generator 2103 interleaves the received derived instruction set from execution planner 2104 and find an optimized way to combine multiple goals.

How does it combine? Instruction generator 2103 can assist in combining the instructions by benchmarking the milestones. For example, relating to an insurance bot, creating milestone 1 (i.e., initial stage)—should do this x number of stages, where in x denotes an action and creating milestone 2—(e.g., recovery stage, closure stage, etc.) can include a set of instructions to be done in each stage. In each milestone and stage there will be some outcome the bot is monitoring (using the service actuator 2200).

Furthermore, instruction generator 2103 can generate instruction sets into one full flow of instructions to be executed by the exoskeleton. 2103 can interact with service actuator 2200 on type of data to be used (e.g., text bot, video or command based) and it stores data about the incident/solution to its knowledge base for future use.

Execution Planner 2104

Execution Planner 2104 manages the derived goal set. Execution planner 2104 can collect the solution steps from each bot (i.e., this is the derived goal set to solve a problem). Execution planner 2104 can generate the solution steps taken from each bot into commands, known as "derived instruction set". Execution planner 2104 could contain multiple instruction sets, one instruction set from each bot and can communicate with each of the instruction sets to instruction generator 2103. Execution planner 2104 contains milestones for each desired goal and might identify an unsatisfying execution status. In such a case, replanning must be done to rebuild the bot and/or the goals.

Service Actuator 2200

Service actuator 2200 (see FIG. 2) is an orchestrator that interacts with exoskeleton actuator 2500 to orchestrate the commands received from instruction generator 2103 using instruction executor 2202. It can perform its main functionality by using the following subcomponents: instruction controller 2201, instruction executor 2202 and feature tracker 2203.

Instruction Controller 2201

Instruction controller 2201 has the following capabilities and characteristics: i) receives the goals pair and the order of execution (plan) based on execution planner 2104, ii) shares the instruction(s) with instruction executor 2202 and receives the response from instruction executor 2202, iii) based on the response from instruction executor 2202 to find the goal status, iv) if service company response is required, then instructions are modified and v) interacts with feature tracker 2203 for exoskeleton feature to be used. It is noted that instruction controller 2201 may receive a set of instructions to be executed from instruction generator 2103 (subcomponent of data intelligence bot 2100).

Instruction Executor 2202

Instruction executor 2202 has the following capabilities and characteristics: i) can interact with instruction controller 2201 to receive the set of instruction to be executed, ii) shares the instruction with exoskeleton actuator 2500 for execution, iii) orders the exoskeleton to execute the interleaved commands, iv) shares the response of execution with instruction controller 2201, v) receives the response from the exoskeleton as to the problem being resolved or not, vi) generates and shares the status if the issue is solved or not. for example, instruction executor 2201 reports the status to service monitor 2400, vii) in each milestone and stage there would be some outcome of the bot that this instruction executor is monitoring. If it is not satisfied, it can send the response to execution planner and viii) execution of instructions.

Feature Tracker 2203

Feature tracker 2203 has the following capabilities and characteristics, tracks the exoskeleton feature to be used for current command and shares with instruction controller 2201. If current feature is not usable then it can share the same with instruction controller 2201 for the use of alternate feature.

Service Optimizer 2300

Service optimizer 2300 and data intelligence bot 2100 are interconnected. The main purpose/functionality is to find the right solution for the service request using the service optimizer. The task of the service optimizer is to identify the right service, whereby the task of the data intelligence bot combines the different knowledge.

Furthermore, as the commands get executed in the instruction generator 2103, the results/outcome will come back as feedback. Based on the feedback, the service is collaborative with several bot instruction sets, and it has ability to sync with other different bots. The extension of these collaborative agents is to give additional features for the actuator. Service actuator gets triggered by use case scenarios, for the type of service bot to actuate. So, in this present invention, embodiment decodes the text instructions or recommended video recorded from multiple bots into an interleaved set of instructions to be executed by service actuator part.

Service monitor 2400 has the capability to interface and communicate to a service company (i.e., 120) from service actuator 2200.

Exoskeleton actuator 2500 has the capability to interface and communicate directly with the exoskeleton suit (i.e., 102). For example, instructions (e.g., movement, lifting, etc.) from service actuator 2200 are passed through 2500.

Service Company Server 120

Service company server 120 is an "external" (i.e., not part of CPS 110 server) server. It is an application server that primary functions in a support role to CPS 110 server. A service company utilizes server 120 to house custom applications. For example, a service company can register to provide service at the Hosted IT Service Company (i.e., 110). That same service company can be a breakdown assistance company, an insurance company, a medical agency, etc.

Other characteristics of a service company (leveraging server 120) can include, but it is not limited to the following: i) the bot assembly building process is done by a service company and ii) it can coordinate with farm of bots to bid and bill.

An example scenario of a service company, utilizing server 120, is a car service company. This car service company can register at the Hosted IT Service (i.e., via server 110) to use this technology. For example, it is a mechanic provider car service company. If the mechanic register with the Hosted IT Service company, then whenever it is an unknown solution and the data base does not contain the info, then a service company gets a request from Hosted IT Services for a fix by a person. Therefore, the car service company can send a service engineer (to resolve the issue) in case of a required car repair. If the hosted automated service engineer could not solve the problem only then, problem goes to a real person (video call with a real engineer).

Another example of a service company could be a medical company, wherein there is a medical emergency (i.e., a vehicle accident). The paramedic care can be given by exoskeleton with the medical guidance.

Another example of a service company could be an insurance company, then they would like to receive all relevant information relating to the accident, including about the location. In this case, the embodiment of the present invention will use the service actuator 2200. How does service actuator 2200 interact with the exoskeleton suit as it relates to the insurance company? The first step, service actuator 2200 would trigger a bot, sending commands to the exoskeleton. Then the service actuator checks the insurance of the person. Thus, a medical insurance bot gets actuated by service and a set of commands from service actuator 2200. The service actuator 2200 checks the insurance of the vehicle. The insurance bot gets actuated to take photographs from different angles, to send them to the insurance agency, etc.

Embodiment of the present invention can reside on server 110, server 120 or in a any combination.

FIG. 3 is a diagram illustrating high level steps of data intelligence bot 2100 as it searches KB (knowledgebase) database for solutions, designated as 300, in accordance with an embodiment of the present invention. An example of two possible services/bots (e.g., insurance and medical bots) that can be invoked after an automobile accident will be provided.

This service is collaborative with many bots instruction sets and has ability to sync with many different bots. The extension of these collaborative agents is to give additional features for the actuator. Service actuator gets triggered by use case scenarios (i.e., based on the type of service bot to actuate). Thus, embodiment decodes the text instructions or recommended video recorded from multiple bots into interleaved set of instructions to be executed by service actuator portion.

In the example in FIG. 3, step 310 involves service identifier determining that there are two services that are relevant to the vehicle accident. Step 310 lead to the bot assembler process (step 311, wherein the two services identified (e.g., insurance and medical bots)). Thus, the next two steps (e.g., step 312 and step 313) are parallel from step 311. Step 312 and step 313, denotes that the specific bots are invoked. Then the next steps (314 and 315), the bots are searching through the insurance and medical knowledge base, respectively. Each bot would generate a problem and instruction/goal set (step 316 and step 317) before generating an overall ((Problem): (Instruction-Goal)) set and individual ((Problem): (Instruction-Goal): priority set) set (i.e., step 318 and step 319).

An example of a problem (a priority set) relating to the insurance would be validating the following: i) is driver license valid? ii) what is intoxication status of driver, is it within the legal permissible limit? and iii) what is insurance policy status (of the driver), is it valid (i.e., has not expired/lapsed)?

Another example of a problem (a priority set) can relate to a medical issue (as a result of the accident) would be validating the following: i) is driver breathing (i.e., alive)? and ii) is the driver's conscious? After the priority set and other set have been generated then an execution order set is generated for the user (step 320).

Figure 4:
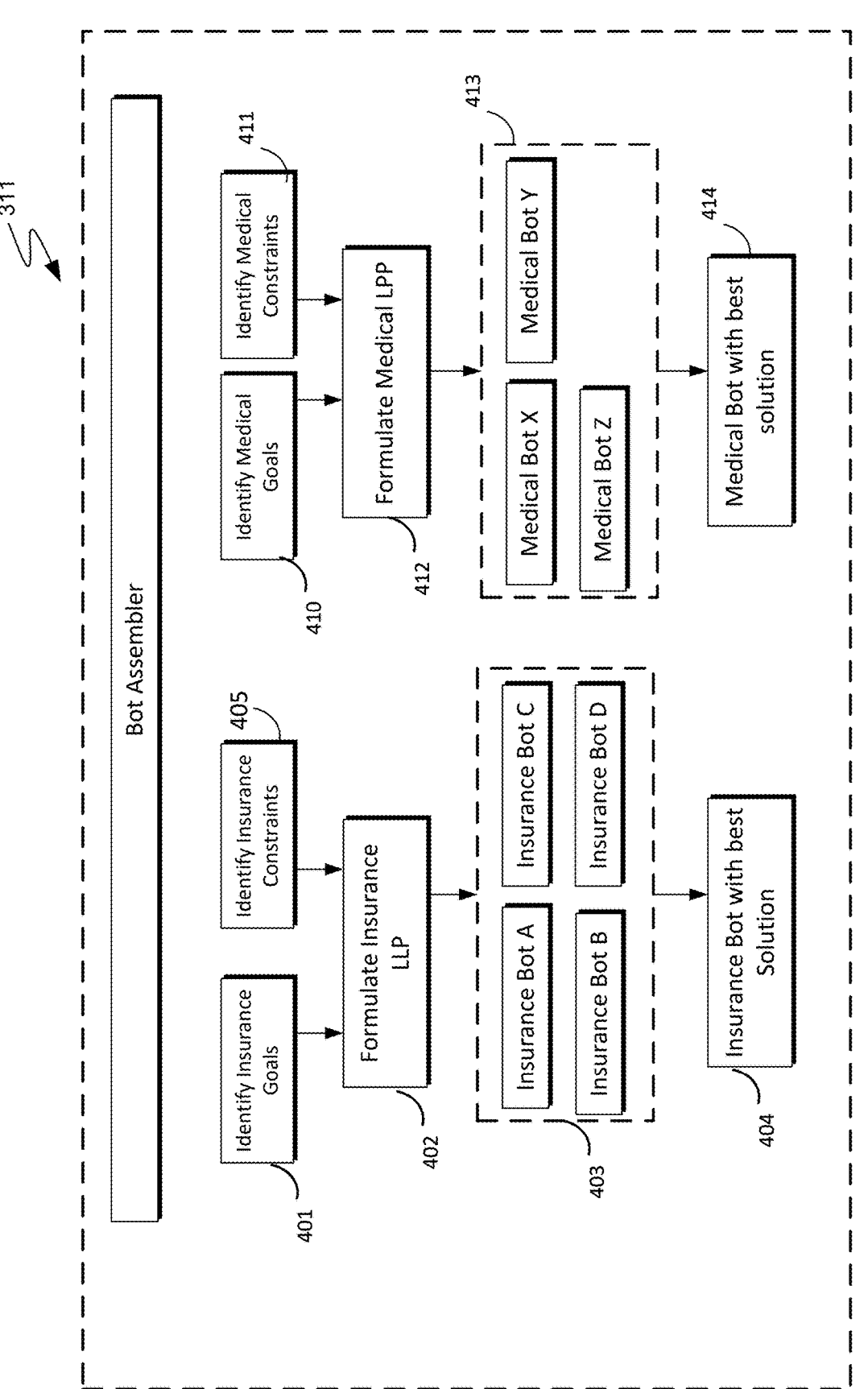
FIG. 4 is a diagram illustrating a detailed view of step 311 of FIG. 3, as it relates to bot assembler, in accordance with an embodiment of the present invention.

FIG. 4 is a diagram illustrating a detailed view of step 311 of FIG. 3, as it relates to bot assembler. The flowchart outlines the flow to determine the different bots that needs to be selected from the example cited from FIG. 3.

Block 401 to Block 404 denotes the insurance bot process. Block 401 denotes the bot is identifying insurance goals and block 405 denotes the bot is identifying insurance constraints. Block 402 denotes the bot formulating insurance LPP (linear programming problem) for multi-criteria decision analysis. Block 403 denotes individual bots bidding on solutions wherein the best solution will be selected. Thus, block 404 is the result of the bot with the best solution being selected by bot assembling process (i.e., 311).

Block 410 to Block 414 denotes the medical bot process. Block 410 denotes the bot is identifying medical goals and block 411 denotes the bot is identifying medical constraints. Block 412 denotes the bot formulating medical LPP for multi-criteria decision analysis. Block 413 denotes individual bots bidding on solutions wherein the best solution will be selected. Thus, block 414 is the result of the bot with the best solution being selected by bot assembling process (i.e., 311).

Figure 5:
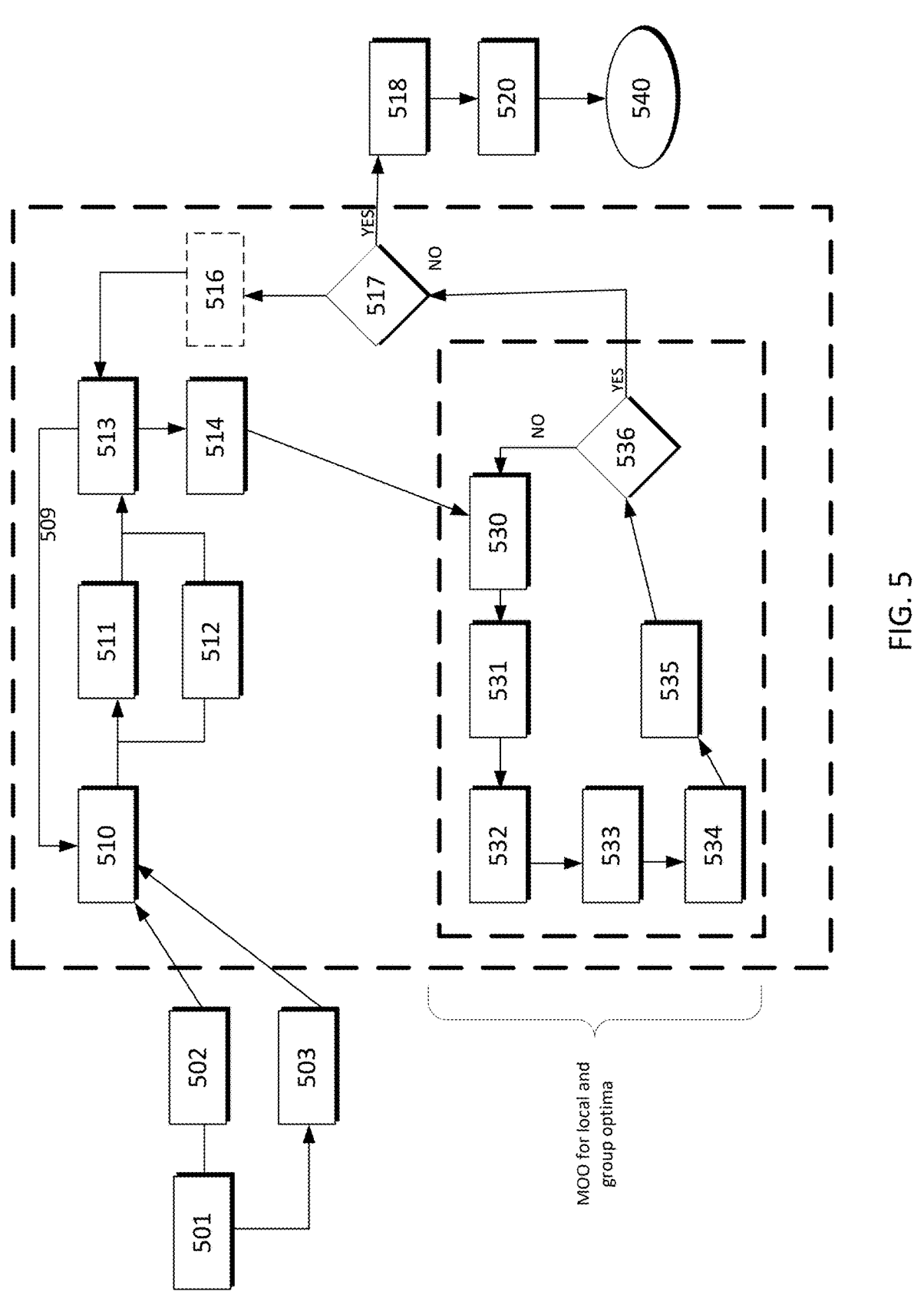
FIG. 5 illustrates a process to determine how the different bots, of data intelligence bot 2100, are selected as it relates to instructing the exoskeleton.

FIG. 5 illustrates a process to determine how the different bots, of data intelligence bot 2100, are selected as it relates to instructing the exoskeleton.

Block 501 denotes IoT and exoskeleton sensors. Here, the sensors share all data from all IoT devices and/or sensors, such as, all the functions that the device can perform, exact location of devices, etc. This allows embodiment to understand the set of capabilities and constraints for all devices in the environment.

Block 502 denotes data points. The data points includes capabilities and constraints, which can be variable, as denoted by n, (e.g., 1, 2, 3, 4, . . . , n) and can be stored in multi-dimension matrix/vectors. Block 503 denotes the step of identifying emergencies.

Block 510 denotes a pre-processing step to refine the sensor data and objective functions. Block 511 denotes the step of identifying group and local objective function and constraints and capabilities set. Block 512 denotes the step for the group objective function to resolve the issue.

Block 513 denotes the step of setting up multiple objectives within local objectives as helper objective functions (e.g., obj 1, . . . , obj n). Furthermore, group optima are also defined within this step. Block 514 denotes the step of converting categorial data to numerical (MOO sake). Arrow 509 denotes the process of keeping the sync for dynamic data between block 514 and block 510.

Block 516 denotes the use of dynamic MOO (multiple objective optimization) algorithm(s).

Block 518 denotes the step of identifying best solution that meets the local and group optima. This would translate to mapping of the bot's capabilities. Block 520 denotes identifying the bots that meets the criteria and then block 540 would denote activating the exoskeleton to take action.

Decision block 517 determines if the step has met the group optima. If it has then the process would proceed to block 518. Otherwise, block 516 would be invoked to use a dynamic MOO algorithm for block 513.

Block 530 denotes the step of framing multi-objective optimization (MOO) problem (constraints plus objectives). Block 531 denotes the step of initializing an algorithm with MOO and constraints wherein the all the objectives are considered MIN (of the functions). Block 532 denotes defining a termination criterion (i.e., n-gen=N) for the function to terminate. Block 533 denotes the step of optimization and block 534 denotes the step of checking for convergence. Block 535 denotes the step of checking on other parameters, such as, constraint satisfaction, pareto front and hyper volume.

Decision block 536 determines if there is approximation of the function yet. If there is, then proceed to decision block 517 to determine if the group optima have been met. Otherwise, repeat the steps, starting with block 530. It is noted that MOO (multi-objective optimization) technique was used to illustrate FIG. 5, any existing method that is in the area of multiple-criteria decision making (MCMD) and/or mathematical optimization problems (e.g., evolutionary algorithm, Bayesian optimization, simulated annealing, etc.) may be used for selecting bots with a feasible and/or optimal solutions.

Figure 6:
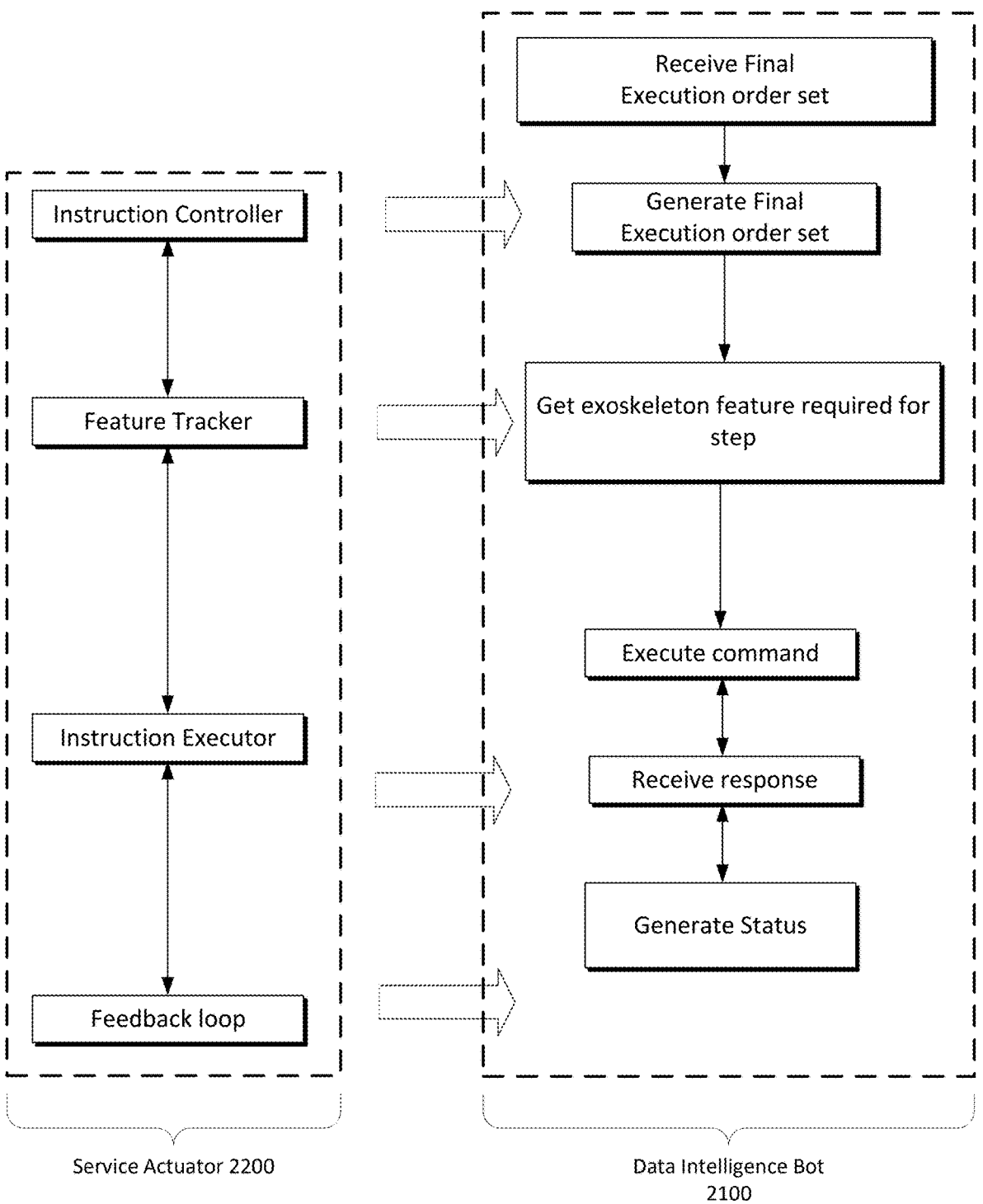
FIG. 6 is a diagram illustrating interaction between service actuator 2200 and data intelligence bot 2100, in accordance with an embodiment of the present invention.

FIG. 6 is a diagram illustrating the interaction between service actuator 2200 and data intelligence bot 2100 (as a continuation of FIG. 3), wherein there is a vehicle accident and embodiment of suit management component 111 is determining the instructions set for the exoskeleton and other solutions for the user and/or client. One or more solutions have been found and service actuator 2300 converts the solution (from text/video/command) to actionable jobs and sends to exoskeleton actuator.

Scenario Example One

FIG. 7 is a flow chart, designated as 700, corresponding to a use case scenario, a vehicle accident situation, wherein the steps (1-16) illustrate the process of suit management component 111. It is noted that all example of various use case scenario involving one or more vehicles will have one or more exoskeleton suits stored in them. The following 16 steps can be processed to resolve the issues and problem stemming from a vehicle accident. For example, depending on the severity of the accident, as it relates to the occupant and/or driver of the vehicle, embodiment may contact the paramedic care and also contact the insurance automatically without requiring the injured occupant/driver.

These are high-level steps: Step 1, the user (driver) asks for help with car repair. Step 2, the exoskeleton (inside the vehicle) makes a service discovery call. Step 3 exoskeleton makes a service discovery call to the hosted service. Step 4, discovery service identifies the service and calls the DIB (Data intelligence bot). Step 5, DIB, searches the KB database for solution(s). Part of step 5, includes a decision-making process, are there any solutions available? If there are no solutions available, then the process proceeds to inform the service actuator that no known solution is available. Otherwise, if there is a known solution, then process will inform service actuator that a known solution has been found. Step 6, service actuator converts solution (from text/video/command) to actionable jobs and sends to exoskeleton actuator. Step 7, exoskeleton actuator executes the jobs and requests feedback from exoskeleton sensors (e.g., via IoT devices, etc.). Step 8, exoskeleton sensor sends feedback to exoskeletons actuator. Step 9, exoskeleton actuator sensor sends feedback to service actuator. Step 10, process informs service monitor with status. However, there is a decision block relating to the question of, "What is the service monitor status? Is the problem fixed?" If the problem is fixed, then the process informs the service monitor with the status of the solution/problem. Step 11, process informs service actuator with the "fixed" status (i.e., status="FIXED"). Otherwise, process would inform service monitor that the problem has not been fixed (i.e., status="FURTHER STEPS REQUIRED). This would lead to step 12 (dealing with not fixed status), wherein service monitor makes a call to the service company (i.e., service company server 120) and then step 13, the service company would send solutions to service actuator.

Step 14, service actuator informs DIB with a successful response. Step 15, DIB stores the current solution into it's knowledge base and informs service discover service for connection termination. Step 16, service discover service informs exoskeleton connector with success and terminates the connection.

Scenario Example Two

Figure 8:
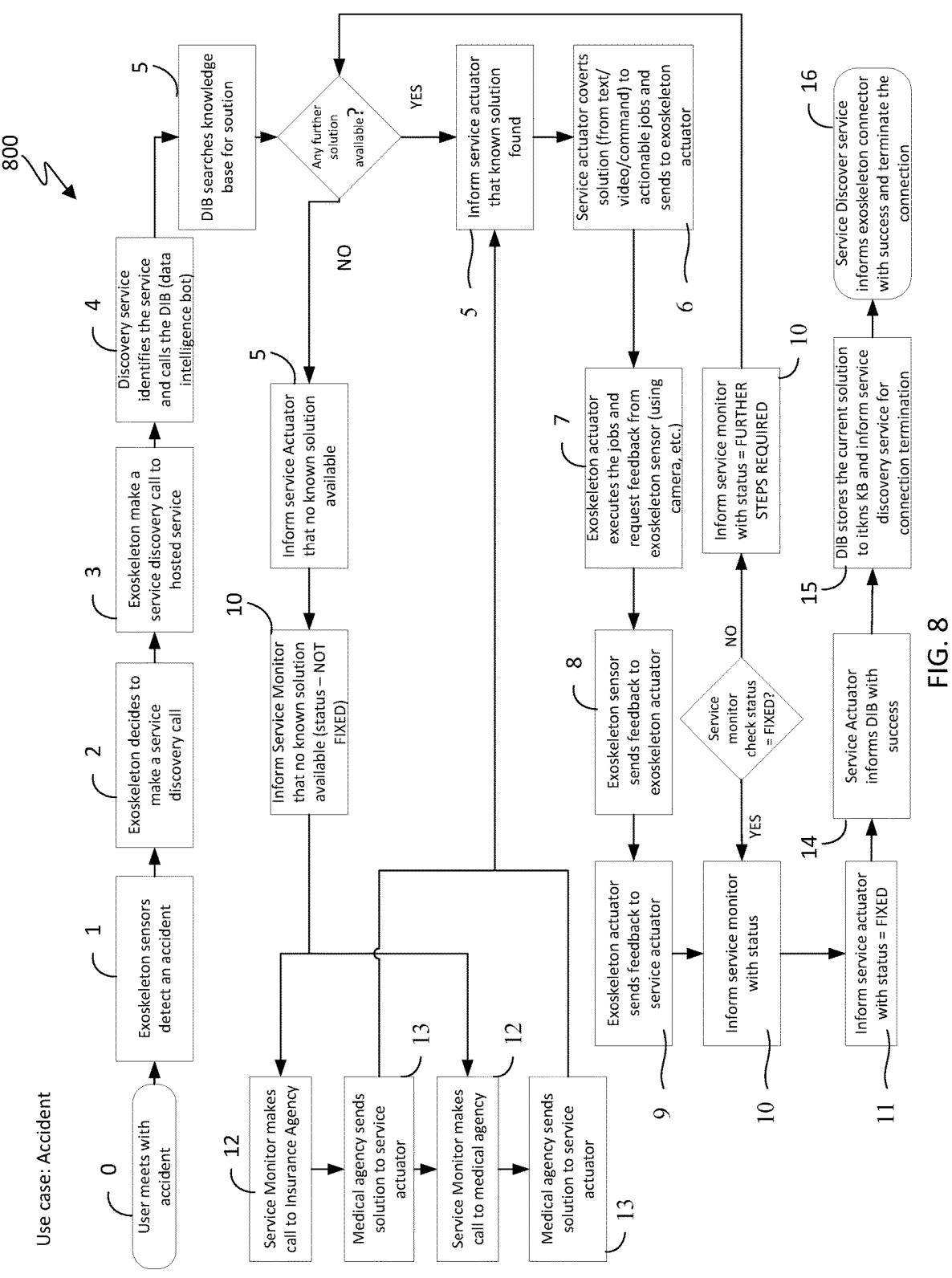
FIG. 8 is a flow chart corresponding to a use case scenario, vehicle repair situation, wherein the steps (1-16) illustrate the process of suit management component 111, in accordance with an embodiment of the present invention.

FIG. 8 is a flow chart, designated as 800, corresponding to a use case scenario, a vehicle repair situation, wherein the steps (1-16) illustrate the process of suit management component 111. When there is a vehicle breakdown while on a long drive and it is not easy to connect to people or get any kind of help, embodiment may assist the driver of the vehicle. It is noted that all examples of various use case scenario involving one or more vehicles will have one or more exoskeleton suits stored in them. The following 16 steps can be processed to resolve the problem or call the right service engineer to get the issue fixed. It is noted that 16 steps are similar to the steps from FIG. 7.

The differences between FIG. 7 and FIG. 8 will be highlighted below: step 12 through step 14 of FIG. 8 will deal with a medical agency and insurance agency. Instead of a car service company. Step 12, the service monitor makes a call to the insurance company and then (step 13), the medical agency sends a solution to the service actuator. Step 12 and step 13 are repeated for the medical company as well.

High-Level Process Flowchart

FIG. 9 is a high-level flowchart illustrating the operation of suit management component 111, designated as 900, in accordance with an embodiment of the present invention. A scenario (from FIG. 8 or FIG. 9) can be used to illustrate the high-level process of suit management component 111. A use case of a vehicle repair (from FIG. 9) will be used. A vehicle belonging to a user, hits a pothole and suffers a tire blow out. The user is not injured by the blow out from one of the tires and is able to pull safely alongside of the road.

Suit management component 111 receives a plurality of data from a user and devices (step 902). In an embodiment, suit management component 111 receives the following, but it is not limited to, environmental data, user data and exoskeleton data. Environmental data (via sensors located on the vehicle) can include, but is not limited to, road conditions, weather condition, traffic conditions, vehicle system status, GPS (global positioning system) location of the vehicle, vehicle damage status, etc. User data (via personal wearable device, such as, smart watch, smart phone, etc.) can include, but is not limited to, heart rate of the user, body temperature of the user, etc. Exoskeleton data (via sensors located on the exoskeleton) can include, but is not limited to, exoskeleton status, GPS location, crash status, etc. Referring to the user case scenario of a vehicle repair, the plurality of data can be received from various sensors (e.g., IoT devices 104, onboard sensors from the vehicle, onboard sensors from exoskeleton, personal devices belonging to the user/driver, etc.).

Suit management component 111 analyzes one or more problems associated with the plurality of data (step 904). In an embodiment, suit management component 111, via CPS server 110, analyzes the received data. Recall that CPS server 110 comprised of components, data intelligence bot, service actuator, service optimizer, service monitor, KB database and exoskeleton actuator. The general analysis steps, includes the following: i) identifying, by one or more bots, one or more services based on the plurality of data, ii) searching, by one or more bots, through the KB database by one or more bots belonging to the data intelligence component, iii) generating, by one or more bots, one or more instruction sets, wherein the one or more instruction sets includes an overall goal set and an individual priority set, iv) determining, by one or more bots, an optimal solution based on the one or more instruction sets and v) generating, by one or more bots, a final execution order set based on the optimal solution. See block 2 to block 5 of FIG. 8. Referring to the user case scenario of the vehicle repair, the one or more problems, identified by suit management component 111, would be, at least the status of the blown tire. Other issues relating to the problem may include, but is not limited to: i) is there a spare tire? ii) are there tools to change the blown tire? and iii) can the user change the blown tire with the spare? Suit management component 111 can analyze the problems/issues based on the available data (e.g., environmental data, user data and exoskeleton data, etc.). In this scenario, there is a spare tire and there are tools to change the blown tire.

Suit management component 111 determines one or more solutions for the one or more problems based on the analysis (step 906). In an embodiment, suit management component 111, through data intelligence bot 2100 and through discover server 2010 and through KB database 130, searches and determines solutions (if one exists) for the problem. It is possible to have no solutions and suit management component 111 would need to communicate to an external party for help (e.g., medical agency, insurance agency, etc.). Referring to the user case scenario of a vehicle repair, suit management component 111, determines the solution is to replace the blown tire with the spare tire.

If there are several solutions, then suit management component 111 identifies an optimal solution from the various solutions (step 908). Suit management component 111 can utilize the following steps to determine an optimal solution: i) identifying one or more capabilities and constraints of devices, ii) saving data points of the one or more capabilities and constraints as one or more vectors, iii) identifying a group objective function based on the one or more vectors in order to optimize the data points, iv) setting the local and group optima for the group objective function, v) optimizing the group function until a threshold criteria has been met and vi) identifying the optimal solution after meeting the threshold criteria. It is noted that the steps of determining the optimal solution (i.e., determining which bots are selected) is also illustrated in FIG. 5. Referring to the user case scenario of a vehicle repair (i.e., blown tire), one of the solutions was to replace the blown tire. However, the user is unable to complete this task due to the physical limitation of the user (e.g., not strong enough to lift the spare, etc.). Thus, the only solution (i.e., optimal solution) is for the user to wear the exoskeleton suit to perform the tire change.

Suit management component 111 instructing the one or more exoskeleton suits with the one or more solutions (step 910). In an embodiment, suit management component 111 instructs the exoskeleton suit worn by the user by the following steps: i) converting the one or more solutions into actional instructions set and ii) sending the actional instruction set to the exoskeleton suits (via exoskeleton actuator 2500 or similar components within CPS server 110). Referring to the user case scenario of a vehicle repair (i.e., blown tire), one of the solutions was to replace the blown tire with the exoskeleton suit (worn by the user). Furthermore, the instruction set (from the optimal solution) must be translated/converted into an actionable instruction set for the suit. Thus, the task of conversion is done by the following components, service actuator 2220 and exoskeleton actuator 2500.

The exoskeleton suit performs the instructions, based on the optimal solution (step 912). In an embodiment, suit management component 111 converts the instruction set to an actionable command. Furthermore, the actionable command is sent via exoskeleton actuator 2500 to the exoskeleton to perform the action. Referring to the user case scenario of a vehicle repair, the exoskeleton is now able to perform the actionable item (i.e., replacing the blown tire with the spare tire).

OTHER EMBODIMENTS/COMMENTS

Other embodiments of the present invention may include the following method, steps and/or systems:

An exoskeleton suit to be worn by a non-human (i.e., animal) to assist with various task and activities (referring to FIG. 1 wherein user 101 is a non-human). For example, dolphins may be trained to perform search and rescue and/or mine detection (military related) with a specialized/custom exoskeleton suit.

Alternatively, the proposed concept/steps/methods and systems may be summarized in a nutshell in the following clauses:

Self-assembling bots that bid to participate in an execution flow-based on the situation (issues like accident) and constraints (or a shared goal).

Collaborative planning and execution of bots, in a controlled manner with cross cutting concerns, to achieve the desired and shared goals.

A method to co-ordinate the execution of the plan using human and exoskeleton interface.

The semi-autonomous takeover of the central platform service by having the exoskeleton guide the human during necessary limb movements helps in improving human computer experience which comes under Cloud Pack for Automation.

Exoskeleton initialization, pro-action, and reaction aligned with behavior style such as driving style.

Other clauses that summarized the proposed concepts/steps/methods may include:

A central platform service hosting a farm of bots that can collaborate amongst themselves and work with the exoskeletons to take care of multiple types of issues, at the same time.

Each of these bots have their own intelligence and specialize in different domains, such as but not limited to, repair assistance, insurance assistance, paramedical assistance, police assistance, etc.

The bots use the connected exoskeleton, and guides the person while, performing the relevant tasks.

The bots are added to the platform or farm by an organization and will acts as proxy for an expert in the respective organization.

The central platform service is situation-aware based on information collected from the exoskeleton, and dynamically respond to the situation.

The central platform service dynamically assembles the bots from the farm of bots, to achieve the desired goal.

It publishes the intermediate milestones that must be achieved, before reaching the desired, final goal.

It enables the bots (with cross cutting concerns) to collaborate and come up with a shared plan and individual plans (using execution planner), to achieve the desired goals.

The central platform service uses the exoskeleton to coordinate and run the shared plan in a controlled manner.

Using instruction executer, the central platform service orchestrates the execution of the shared plan using the exoskeleton, which executes the commands.

Using instruction controller, the central platform service monitors the execution of the shared plan milestone by milestone, to give feedback to the bots.

The central platform service uses the signals from the bots, at the end of every milestone, to re-plan the execution if necessary.

Hardware Environment

Figure 10:
FIG. 10 depicts a block diagram, designated as 1000, of components of a server computer capable of executing the suit management component 111 within exoskeleton management environment 100, in accordance with an embodiment of the present invention.

FIG. 10 depicts a block diagram, designated as 1000, of components of a server computer capable of executing the suit management component 111 within exoskeleton management environment 1000, in accordance with an embodiment of the present invention. It should be appreciated that FIG. 10 provides only an illustration of one implementation and does not imply any limitations with regard to the environments in which different embodiments may be implemented. Many modifications to the depicted environment may be made.

It is to be understood that embodiments of the present invention may be executed inside a cloud-computing infrastructure and is not limited to network servers.

FIG. 10 includes processor(s) 1001, cache 1003, memory 1002, persistent storage 1005, communications unit 1007, input/output (I/O) interface(s) 1006, and communications fabric 1004. Communications fabric 1004 provides communications between cache 1003, memory 1002, persistent storage 1005, communications unit 1007, and input/output (I/O) interface(s) 1006. Communications fabric 1004 can be implemented with any architecture designed for passing data and/or control information between processors (such as microprocessors, communications and network processors, etc.), system memory, peripheral devices, and any other hardware components within a system. For example, communications fabric 1004 can be implemented with one or more buses or a crossbar switch.

Memory 1002 and persistent storage 1005 are computer readable storage media. In this embodiment, memory 1002 includes random access memory (RAM). In general, memory 1002 can include any suitable volatile or non-volatile computer readable storage media. Cache 1003 is a fast memory that enhances the performance of processor(s) 1001 by holding recently accessed data, and data near recently accessed data, from memory 1002.

Program instructions and data (e.g., software and data x10) used to practice embodiments of the present invention may be stored in persistent storage 1005 and in memory 1002 for execution by one or more of the respective processor(s) 1001 via cache 1003. In an embodiment, persistent storage 1005 includes a magnetic hard disk drive. Alternatively, or in addition to a magnetic hard disk drive, persistent storage 1005 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 1005 may also be removable. For example, a removable hard drive may be used for persistent storage 1005. Other examples include optical and magnetic disks, thumb drives, and smart cards that are inserted into a drive for transfer onto another computer readable storage medium that is also part of persistent storage 1005. Satellite management component 111 can be stored in persistent storage 1005 for access and/or execution by one or more of the respective processor(s) 1001 via cache 1003.

Communications unit 1007, in these examples, provides for communications with other data processing systems or devices. In these examples, communications unit 1007 includes one or more network interface cards. Communications unit 1007 may provide communications through the use of either or both physical and wireless communications links. Program instructions and data (e.g., Satellite management component 111) used to practice embodiments of the present invention may be downloaded to persistent storage 1005 through communications unit 1007.

I/O interface(s) 1006 allows for input and output of data with other devices that may be connected to each computer system. For example, I/O interface(s) 1006 may provide a connection to external device(s) 1008, such as a keyboard, a keypad, a touch screen, and/or some other suitable input device. External device(s) 1008 can also include portable computer readable storage media, such as, for example, thumb drives, portable optical or magnetic disks, and memory cards. Program instructions and data (e.g., Satellite management component 111) used to practice embodiments of the present invention can be stored on such portable computer readable storage media and can be loaded onto persistent storage 1005 via I/O interface(s) 1006. I/O interface(s) 1006 also connects to display 1010.

Display 1010 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for assisting users with physical activities by using one or more exoskeleton suits, the computer-implemented method comprising:

receiving, by one or more processors, a plurality of data from a user and devices;

analyzing, by the one or more processors, one or more problems associated with the plurality of data;

determining, by the one or more processors, one or more solutions for the one or more problems based on the analysis, further comprising:

identifying one or more capabilities and constraints of devices;

saving data points of the one or more capabilities and constraints as one or more vectors;

identifying a group objective function based on the one or more vectors in order to optimize the data points;

setting local and group optima for the group objective function;

optimizing the group objective function until a threshold criteria has been met; and identifying an optimal solution after meeting the threshold criteria;

identifying, by the one or more processors, an optimal solution from the one or more solutions;

instructing, by the one or more processors, the one or more exoskeleton suits with the optimal solution, wherein the user wears the one or more exoskeleton suits; and performing the instructions, by the one or more exoskeleton suits, based on the optimal solution.

2. The computer-implemented method of claim 1, wherein receiving a plurality of data from a user, wherein the plurality of data comprises one or more of, environmental data, user data and exoskeleton data.

3. The computer-implemented method of claim 1, wherein the analysis is performed by a CPS (central platform service).

4. The computer-implemented method of claim 1, wherein instructing the one or more exoskeleton suits with the one or more solutions:

converting the one or more solutions into actional instructions set; and sending an actional instruction set to the one or more exoskeleton suits.

5. The computer-implemented method of claim 3, wherein the CPS comprises one or more of components, data intelligence bot, service actuator, service optimizer, service monitor, KB database and exoskeleton actuator.

6. The computer-implemented method of claim 5, wherein the analysis comprises:

identifying, by one or more bots, one or more services based on the plurality of data;

searching, by one or more bots, through the KB database by one or more bots belonging to the data intelligence bot;

generating, by one or more bots, one or more instruction sets, wherein the one or more instruction sets includes an overall goal set and an individual priority set;

determining, by one or more bots, an optimal solution based on the one or more instruction sets; and generating, by one or more bots, a final execution order set based on the optimal solution.

7. A computer program product for assisting users with physical activities by using one or more exoskeleton suits, the computer program product including one or more non-transitory computer-readable storage media having computer-readable program instructions stored on the one or more non-transitory computer-readable storage media, said program instructions when executed on a processor, executes a computer-implemented method comprising the steps of:

receiving a plurality of data from a user;

analyzing one or more problems associated with the plurality of data;

determining one or more optimal solutions for the one or more problems based on the analysis further comprising:

identifying one or more capabilities and constraints of devices;

saving data points of the one or more capabilities and constraints as one or more vectors;

identifying a group objective function based on the one or more vectors in order to optimize the data points;

setting local and group optima for the group objective function;

optimizing the group objective function until a threshold criteria has been met; and identifying an optimal solution after meeting the threshold criteria;

instructing one or more exoskeleton suits with one or more solutions, wherein the user wears the one or more exoskeleton suits; and performing the instructions, by the one or more exoskeleton suits, based on the one or more solutions.

8. The computer program product of claim 7, wherein receiving a plurality of data from a user, wherein the plurality of data comprises one or more of, environmental data, user data and exoskeleton data.

9. The computer program product of claim 7, wherein the analysis is performed by a CPS (central platform service).

10. The computer program product of claim 7, wherein instructing the one or more exoskeleton suits with the one or more solutions:

converting the one or more solutions into actional instructions set; and sending the actional instructions set to the one or more exoskeleton suits.

11. The computer program product of claim 9, wherein the CPS comprises one or more of components, data intelligence bot, service actuator, service optimizer, service monitor, KB database and exoskeleton actuator.

12. The computer program product of claim 11, wherein the analysis comprises:

identifying, by one or more bots, one or more services based on the plurality of data;

searching, by one or more bots, through the KB database by one or more bots belonging to the data intelligence bot;

generating, by one or more bots, one or more instruction sets, wherein the one or more instruction sets includes an overall goal set and an individual priority set;

determining, by one or more bots, an optimal solution based on the one or more instruction sets; and generating, by one or more bots, a final execution order set based on the optimal solution.

13. A computer system for assisting users with physical activities by using one or more exoskeleton suits, the computer system comprising:

one or more computer processors; and one or more computer readable storage media having
computer-readable program instructions stored on the
one or more computer readable storage media, said
program instructions executes, by the one or more
computer processors, a computer-implemented method
comprising the steps of:

receiving a plurality of data from a user;

analyzing one or more problems associated with the
plurality of data;

determining one or more optimal solutions for the one
or more problems based on the analysis further
comprising:

identifying one or more capabilities and constraints
of devices;

saving data points of the one or more capabilities and
constraints as one or more vectors;

identifying a group objective function based on the
one or more vectors in order to optimize the data
points;

setting local and group optima for the group objec-
tive function;

optimizing the group objective function until a
threshold criteria has been met; and identifying an optimal solution after meeting the
threshold criteria;

instructing the one or more exoskeleton suits with the
one or more solutions, wherein the user wears the
one or more exoskeleton suits; and performing the instructions, by the one or more exo-
skeleton suits, based on one or more solutions.

14. The computer system of claim 13, wherein the analy-
sis is performed by a CPS (central platform service).

15. The computer system of claim 13, wherein instructing
the one or more exoskeleton suits with the one or more
solutions:

converting the one or more solutions into actional instruc-
tions set; and sending the actional instructions set to the one or more
exoskeleton suits.

16. The computer system of claim 14, wherein the CPS
comprises one or more of components, data intelligence bot,
service actuator, service optimizer, service monitor, KB
database and exoskeleton actuator.

17. The computer system of claim 16, wherein the analy-
sis comprises:

identifying, by one or more bots, one or more services
based on the plurality of data;

searching, by one or more bots, through the KB database
by one or more bots belonging to the data intelligence
bot component;

generating, by one or more bots, one or more instruction
sets, wherein the one or more instruction sets includes
an overall goal set and an individual priority set;

determining, by one or more bots, an optimal solution
based on the one or more instruction sets; and generating, by one or more bots, a final execution order
set based on the optimal solution.

* * * * *